(12) United States Patent
Vujadinovic (10) Patent No.: US 12,076,727 B2
(45) Date of Patent: Sep. 3, 2024

(54) APPARATUS FOR PULVERIZING MATERIAL INCLUDING A STATIONARY HOUSING

(71) Applicant: Klingmill AB, Eskilstuna (SE)

(72) Inventor: Borislav Vujadinovic, Eskilstuna (SE)

(73) Assignee: KLINGMILL AB, Eskilstuna (SE)

( * ) Notice: Subject to any disclaimer, the term of this patent is extended or adjusted under 35 U.S.C. 154(b) by 386 days.

(21) Appl. No.: 17/608,039

(22) PCT Filed: May 13, 2020

(86) PCT No.: PCT/EP2020/063341
§ 371 (c)(1),
(2) Date: Nov. 1, 2021

(87) PCT Pub. No.: WO2020/229544
PCT Pub. Date: Nov. 19, 2020

(65) Prior Publication Data
US 2022/0226832 A1    Jul. 21, 2022

(30) Foreign Application Priority Data

May 14, 2019 (EP) ..................................... 19174372

(51) Int. Cl.
*B02C 18/00* (2006.01)
*B02C 18/14* (2006.01)
(Continued)

(52) U.S. Cl.
CPC .......... *B02C 18/146* (2013.01); *B02C 18/142* (2013.01); *B02C 18/182* (2013.01); *B23D 61/021* (2013.01); *B02C 2018/188* (2013.01)

(58) Field of Classification Search
CPC .... B02C 18/142; B02C 18/182; B02C 18/146
See application file for complete search history.

(56) References Cited

U.S. PATENT DOCUMENTS

| 85,067 A | * | 12/1868 | Burbank | ............... | B02C 18/142 |
| | | | | | 83/145 |
| 201,152 A | * | 3/1878 | Bly | ....................... | B02C 18/182 |
| | | | | | 241/295 |

(Continued)

FOREIGN PATENT DOCUMENTS

| CN | 106216045 A | * | 12/2016 | ......... | B02C 18/0092 |
| CN | 106714970 A | * | 5/2017 | ............. | B02C 18/00 |

(Continued)

*Primary Examiner* — Faye Francis
(74) *Attorney, Agent, or Firm* — Dilworth & Barrese, LLP (57) ABSTRACT

A stationary housing (3) has an interior space (5) and at least one interior wall (7). At least one sawblade (9) is rotatable with respect to the stationary housing (3), and has a periphery (12) provided with a plurality of cutting teeth (15) and a plurality of collecting notches (17). An inlet opening (19) for feeding material to the interior space (5), and an outlet opening (21) for dispatching pulverized material from the interior space (5) are provided in the interior wall (7) of the housing (3), with a plurality of recesses (23) facing the periphery (12) of the sawblade (9) receiving the cut material from collecting notches (17) of the sawblade (9), and reverting the cut material to the periphery (12) of the sawblade (9) so that the material is cut multiple times before dispatch. The interior wall (7) surrounds a main part of the periphery (12) of the sawblade (9), and the inlet opening (19) and the outlet opening (21) are in direct communication with the interior space (5) so that the material enters and leaves the interior space (5) during one revolution of the sawblade (9).

16 Claims, 6 Drawing Sheets

(51) Int. Cl.
*B02C 18/18* (2006.01)
*B23D 61/02* (2006.01)

(56) References Cited

U.S. PATENT DOCUMENTS

| | | | | |
|---|---|---|---|---|
| 201,938 | A * | 4/1878 | Nickerson | B02C 18/182 144/237 |
| 2,468,337 | A | 4/1949 | Lykken et al. | |
| 2,753,908 | A * | 7/1956 | Anderson | C07D 285/01 241/73 |
| 2,903,193 | A * | 9/1959 | Anderson | B02C 18/142 241/73 |
| 3,241,776 | A | 3/1966 | Sheldon | |
| 4,426,044 | A * | 1/1984 | Butler | B02C 18/0007 83/675 |
| 4,625,925 | A * | 12/1986 | Goldhammer | B02C 18/0007 241/293 |
| 4,944,462 | A * | 7/1990 | Raterman | B02C 18/0007 241/166 |
| 5,163,629 | A * | 11/1992 | Raterman | B02C 18/182 241/236 |
| 5,328,107 | A * | 7/1994 | Tsai | B02C 18/182 241/295 |
| 5,915,636 | A * | 6/1999 | Caballero | B02C 19/0075 241/73 |
| 2002/0096584 | A1* | 7/2002 | Ho | B02C 18/0007 241/295 |
| 2004/0140383 | A1* | 7/2004 | Chang | B02C 18/0007 241/236 |
| 2004/0262436 | A1* | 12/2004 | Lo | B02C 18/142 241/236 |
| 2006/0049291 | A1* | 3/2006 | Rajewski | B02C 18/0007 241/236 |
| 2014/0339344 | A1 | 11/2014 | Kim et al. | |
| 2021/0138479 | A1* | 5/2021 | Pernia | B29B 17/04 |

FOREIGN PATENT DOCUMENTS

| | | | |
|---|---|---|---|
| DE | 2659231 A * | 7/1977 | B02C 18/00 |
| DE | 20113535 U1 * | 11/2001 | B02C 18/142 |
| EP | 2818248 A1 | 12/2014 | |
| WO | 2007/054981 A1 | 5/2007 | |

* cited by examiner

APPARATUS FOR PULVERIZING MATERIAL INCLUDING A STATIONARY HOUSING

TECHNICAL FIELD

The present invention relates to an apparatus for pulverizing a material, the apparatus comprising at least one sawblade and a plurality of collecting notches for collecting cut material, and a stationary housing having an interior space housing the at least one sawblade.

The present invention also relates to a method for producing the stationary housing of the apparatus.

BACKGROUND

There exists different apparatus for pulverizing material, such as wood, pellets, and plastic.

US2014339344A1 discloses apparatus for pulverizing a super absorbent polymer that comprises: an inlet portion for feeding the super absorbent polymer, a pulverizing portion for pulverizing the super absorbent polymer fed through the inlet portion, and an outlet portion for discharging the pulverized super absorbent polymer from the pulverizing portion. The pulverizing portion comprises a rotary drum to which a plurality of rotary blades is attached; at least one fixed blade for pulverizing the super absorbent polymer in cooperation with the plural of rotary blades, and a housing for holding the rotary drum and the at least one fixed blade.

WO2007054981A1 discloses an apparatus for cutting raw material, that consists of fixed knives with the shape of sickles and knives on an axis that are attached to teeth-units on a teeth-holder. The teeth-holders enter in between the sickle-shaped knives except uppermost and thus a space for intake is formed where material is drawn in by the knives and is cut between the knives on the axis and the fixed knives.

In many applications, the size of the particles in the pulverized material is important. For example, finely pulverized wood powder burns better and dries faster than wood powder including larger particles. Thus, it is desired to control the size of the cut material.

U.S. Pat. No. 3,241,776 discloses a comminuting apparatus including a stationary housing defining an interior space and having an interior wall facing the interior space, a plurality of spaced apart sawblades is disposed in the interior space and arranged rotatable with respect to the stationary housing. The sawblades have a periphery provided with cutting teeth for cutting the material and a plurality of collecting notches for collecting the cut material. The interior wall of the housing is provided with a plurality of recesses facing the periphery of the sawblades and arranged to deflect cut material in a radial direction back into contact with the cutting teeth of the sawblades. The apparatus further comprises a sieve including a screen provided with apertures of predetermined size disposed below the sawblades for receiving the cut material and to determine the maximum particle size of the cut material that is permitted to exit from the interior space. A disadvantage with using a screen provided with apertures to determine the size of the cut material is that the apertures can be clogged with the cut material. This is particularly a problem if the cut material is moist. For example, it is difficult to pulverize wood with this apparatus, since wood is often moist. This comminuting apparatus is intended for coarsely grind the material, and is not suitable for pulverization of material into powder of fine grinded material.

Further, if wood is to be cut, it is a desire to be able to pulverize a whole log without the need of firstly dividing the log into smaller pieces.

SUMMARY

An aim of the present invention is to provide an improved apparatus for pulverizing material.

This aim is achieved by an apparatus as defined herein.

The apparatus comprises a stationary housing having an interior space and at least one interior wall facing the interior space, at least one sawblade disposed in the interior space and arranged rotatable with respect to the stationary housing in a rotational direction, an inlet opening for feeding material to be pulverized to the interior space, and an outlet opening for dispatching the pulverized material from the interior space. The sawblade is disc-shaped and has a periphery provided with a plurality of cutting teeth for cutting the material and a plurality of collecting notches for collecting the cut material. The interior wall is provided with a plurality of recesses facing the periphery of the sawblade, arranged to receive the cut material from the collecting notches of the sawblade, and to revert the cut material to the periphery of the sawblade so that the material will be cut multiple times before it is dispatched from the apparatus. The interior wall provided with the recesses surrounds a main part of periphery of the at least one sawblade, and the inlet opening and the outlet opening are arranged in the interior wall and in direct communication with the interior space so that the material enters and leaves the interior space during one revolution of the at least one sawblade.

With the term that the outlet opening is arranged in direct communication with the interior space of the stationary housing is meant that there is no obstacle, such as sieve or screen provided with apertures, disposed between the outlet opening and the interior space.

The sawblade is rotating with a high speed. The cutting teeth of the sawblade will cut the material fed to the interior space through the inlet opening. The collecting notches will collect and house the cut material. In the beginning of a revolution, the cut material is rough. Since the sawblade is rotating with respect to the stationary housing, each of the collecting notches will face each of the recesses of the stationary housing once per revolution of the sawblade.

When a collecting notch faces a recess, the cut material in the collecting notch is transferred to the recess by means of the centrifugal force. The cut material travels along the length of the recess. When the particles in the cut material travels in the recess, the speed of the particles is increased until the material reaches the end of the recess, where the speed of the cut material is reduced, and the cut material is redirected by the rear wall of the recess towards the periphery of the sawblade. When the cutting tooth reaches the rear end of the recess, the cut material will be cut a second time and the cut material is collected in the collecting notch. Thus, the size of the material will be reduced. Each time a cutting tooth and a collecting notch pass by one of the recesses during the revolution, the material is cut one more time. The pulverized material leaves the interior space of the housing through the outlet opening after one revolution of the sawblade.

The number of times the material is cut depends on the number of cutting teeth and the number of recesses. For example, if the number of recesses is 5 and the number of cutting teeth is 10, the material is cut 5*10=50 times. Thus, the size of the material can be controlled by the number of recesses in the stationary housing, and the number of cutting teeth.

The apparatus according to the invention makes it possible to achieve a fine grinded powder having particles of a certain size. The invention makes it possible to omit the sieve in order to control the size of the powder. There is no need of a classifier in order to control the size of the powder, which will reduce the costs for manufacturing the powder. The invention makes it possible to pulverize a wet material, such as wood, which would clog the holes in the sieve.

In one aspect, the interior wall including the recesses surrounds at least 60% and preferably at least 70% of the periphery of the at least one sawblade. This makes it possible to increase the number of recesses in the wall, and by that reduce the size of the pulverized material.

In one aspect, the at least one sawblade is disposed so that the distance between the cutting teeth and portions of the interior wall located at the rear ends of the recesses is less than 8 mm, preferably less than 4 mm, and most preferably less than 2 mm. The redirected material is cut between the cutting tooth and the interior wall at the rear end of the recess. The smaller distance between the cutting teeth and the interior wall at the rear ends of the recesses the smaller is the size of the cut material. Further, a small distance between the cutting teeth and the interior wall ensures that most of the redirected material is cut another time.

In one aspect, the apparatus comprises at least three sawblades put together to form a cutting unity and each of the sawblades abuts against the neighboring sawblade in the cutting unity. Thus, it is prevented that a gap is formed between the sawblades and it is ensured that all material coming into contact with the cutting unity is pulverized.

In one aspect, the shape of the recesses, in a cross-section perpendicular to the rotational axis, is tapering in a direction reverse the rotational direction of the at least one sawblade. Thus, the height of the recess in a radial direction is increasing towards the rear end of the recess. This makes it easier to empty the collecting recesses, to reduce the speed of the flow of cut material, and to redirect the flow of cut material.

In one aspect, the length of the recesses is larger than the length of the collecting notches in a cross-section perpendicular to the rotational axis. In one aspect, the length of the recesses is at least three times larger than the length of the collecting notches in a cross-section perpendicular to the rotational axis. This gives the cut material time to be transferred to the recess in one end of the recess, and to redirect the cut material towards the tooth in the other end of the recess.

In one aspect, each recess has a narrow first end and a wide second end, and the wide second end of the recess has a guiding surface designed to guide the flow of cut material towards the periphery of the at least one sawblade. The second end of the recess has a wall designed to form a guiding surface for directing the flow towards the sawblade. The wall can be designed in different ways, for example, the wall can be bent so that the guiding surface is concave, or the wall can be straight and arranged so that the guiding surface is about perpendicular to the periphery of the sawblade.

In one aspect, the guiding surface is concave and the length of the recesses, in a cross-section perpendicular to the rotational axis, is at least twice the bending radius of the guiding surface. Preferably, the guiding surface is concave and the length of the recesses, in a cross-section perpendicular to the rotational axis, is at least 2.5 times larger than the bending radius of the guiding surface. Most preferably, the length of the recesses is at least three times larger than the bending radius of the guiding surface. Due to the fact that the length of the recesses is significantly larger than the bending radius of the second end of the recesses, the particles in the cut material is allowed to accelerate to a high speed before they reach the concave guiding surface at the second end and is redirected towards the cutting tooth of the sawblade. Thus, it is ensured that the cut material reaches the cutting teeth and is cut multiple times.

In one aspect, the number of recesses is more than three, and preferably more than five. The number of times the material is cut depends on the number of recesses. If the number of recesses is increased, the number of times the material is cut is increased and accordingly the size of the cut particles is reduced.

In one aspect, the at least one sawblade comprises a disc-shaped body and the cutting teeth protrude from an outer edge of the body in a radial direction. The distance the cutting teeth is protruding from the outer edge of the body determines cutting depth of the material.

In one aspect, the collecting notches have a front end and rear end with respect to the rotational direction, and the cutting teeth are disposed at the rear ends of the collecting notches.

In one aspect, the width of the cutting teeth is larger than the width of the body in an axial direction. This enables a cutting of a wider part of the material. With the term "in an axial direction" is meant along an axis parallel with the rotational axis.

In one aspect, the collecting notches are evenly distributed along the periphery of at least one sawblade, the periphery of the at least one sawblade is provided with a plurality of empty notches without any cutting teeth arranged between the collecting notches, the at least one sawblade comprises a first sawblade and a second sawblade rotated in relation to the first sawblade so that the empty notches of one of the sawblades are aligned with the collecting notches of the other sawblade in an axial direction. This makes it possible to cut a whole log without the need of dividing the log into smaller pieces.

In one aspect, the interior space of the stationary housing extends along the rotational axis of shaft, and the housing comprises a plurality of plate-shaped pieces having two parallel main sides, wherein the-plate shaped pieces are attached to each other with the main sides facing each other so that that the pieces together form the housing with the interior space. This makes it easier to manufacture the stationary housing.

In one aspect, the apparatus comprises at least one rotatable shaft defining a rotational axis, and the at least one cutting plate is attached to the rotatable shaft and arranged rotatable in a rotational direction about the rotational axis.

The stationary housing can, for example, be manufactured by moulding, and subsequently machining, for example, milling of the interior surface to achieve the recesses in the interior space. However, it can be tricky and time-consuming to achieve the recesses on the interior surface of the interior space by machining since the interior space is long and narrow, and it is difficult to reach the interior surface with the machining tool. It is important that the stationary housing has a high mechanical strength so that it can withstand great mechanical stress. Suitably, the housing is made of a hard material, such as cemented carbide. Such hard materials are difficult to machine.

BRIEF DESCRIPTION OF THE DRAWINGS

The invention will now be explained more closely by the description of different embodiments of the invention and with reference to the appended figures.

DETAILED DESCRIPTION

Figure 1:
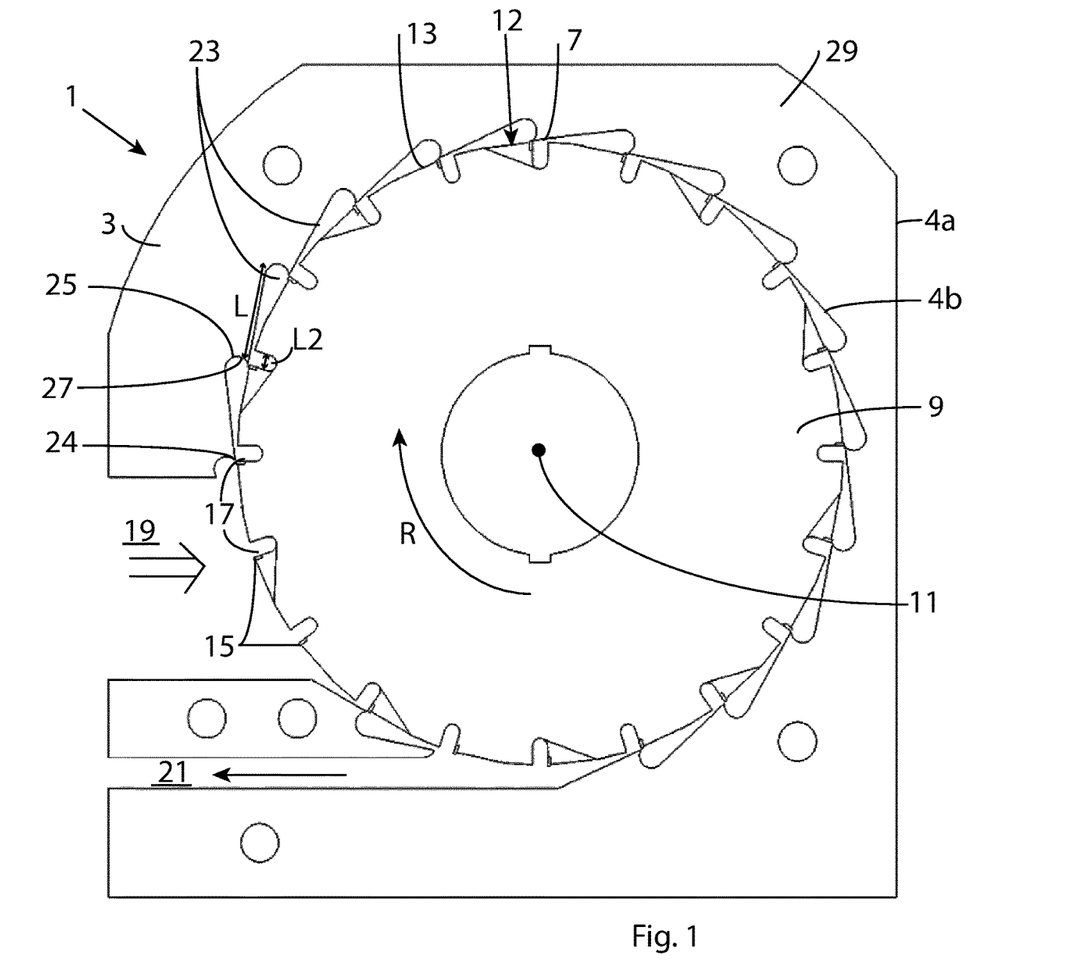
FIG. 1 shows an example of an apparatus for pulverizing a material including a stationary housing and sawblades.
Figure 2:
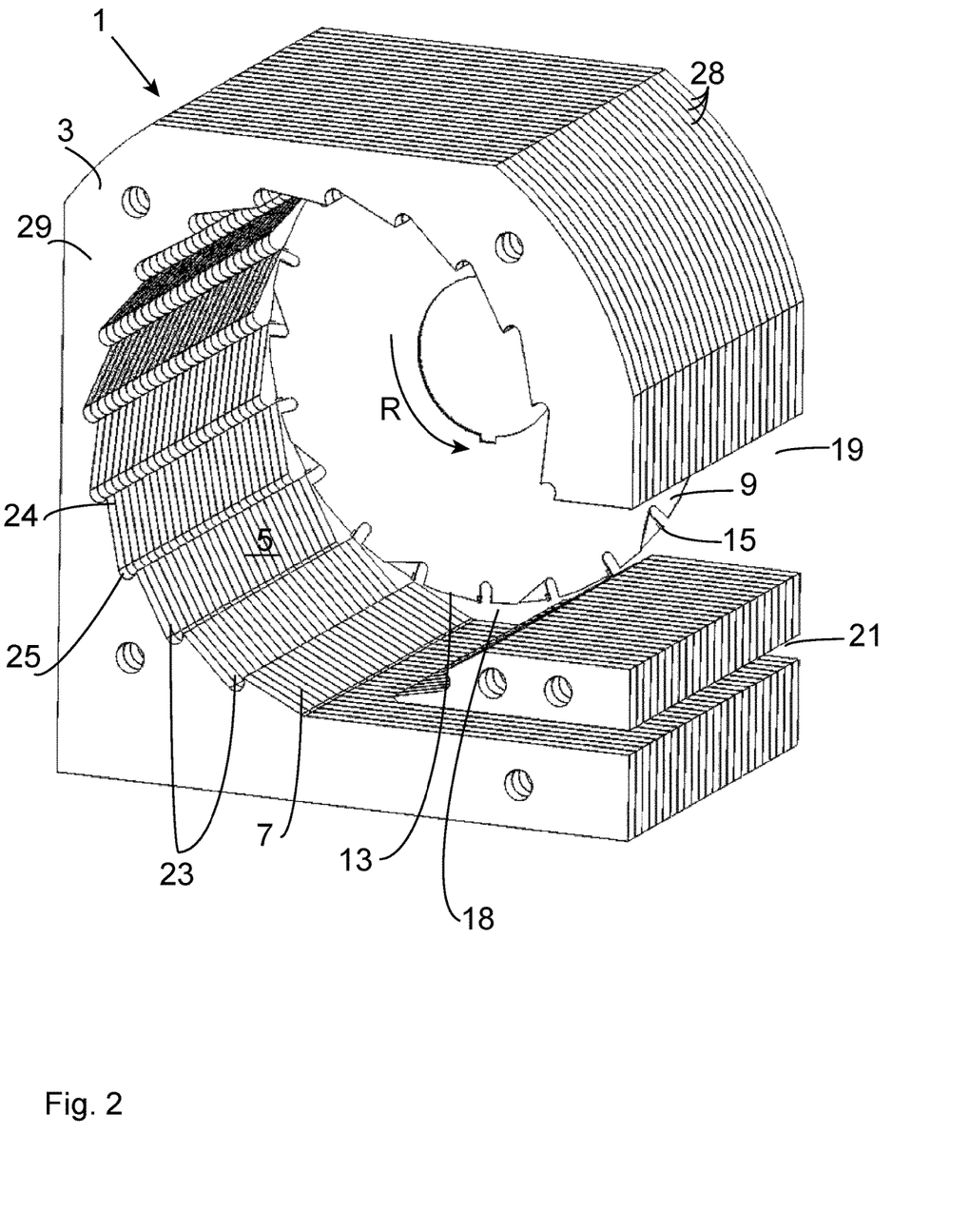
FIG. 2 shows the apparatus of FIG. 1 in a perspective view.

FIG. 1 shows an example of an apparatus 1 for pulverizing a material according to the invention in a cross-section perpendicular to a rotational axis 11. FIG. 2 shows the apparatus 1 in a perspective view. The apparatus 1 can be used for pulverizing various types of material, for example, wood or plastic. The apparatus 1 comprises a stationary housing 3 having an interior space 5 and at least one interior wall 7 facing the interior space 5, as shown in FIG. 2. The shape of the interior space 5 is substantially cylindrical and has a central axis that coincides with the rotational axis 11. The apparatus 1 further comprises one or more sawblades 9 disposed in the interior space 5 and arranged rotatable with respect to the stationary housing 3 about the rotational axis 11. The one or more sawblades 9 are disc-shaped and have a substantially circular periphery. Preferably, the apparatus comprises two or more sawblades 9. The number of sawblades 9 needed depends on the width of the material to be pulverized. The rotational axis 11 of the one or more sawblades 9 coincides with the central axis of the interior space 5. The rotational direction R of the one or more sawblades 9 is illustrated by an arrow in the FIG. 1. The periphery 12 of sawblade 9 is provided with a plurality of cutting teeth 15 for cutting the material and a plurality of collecting notches 17 for collecting the cut material. The cutting teeth 15 have cutting edges for cutting the material.

Figure 3:
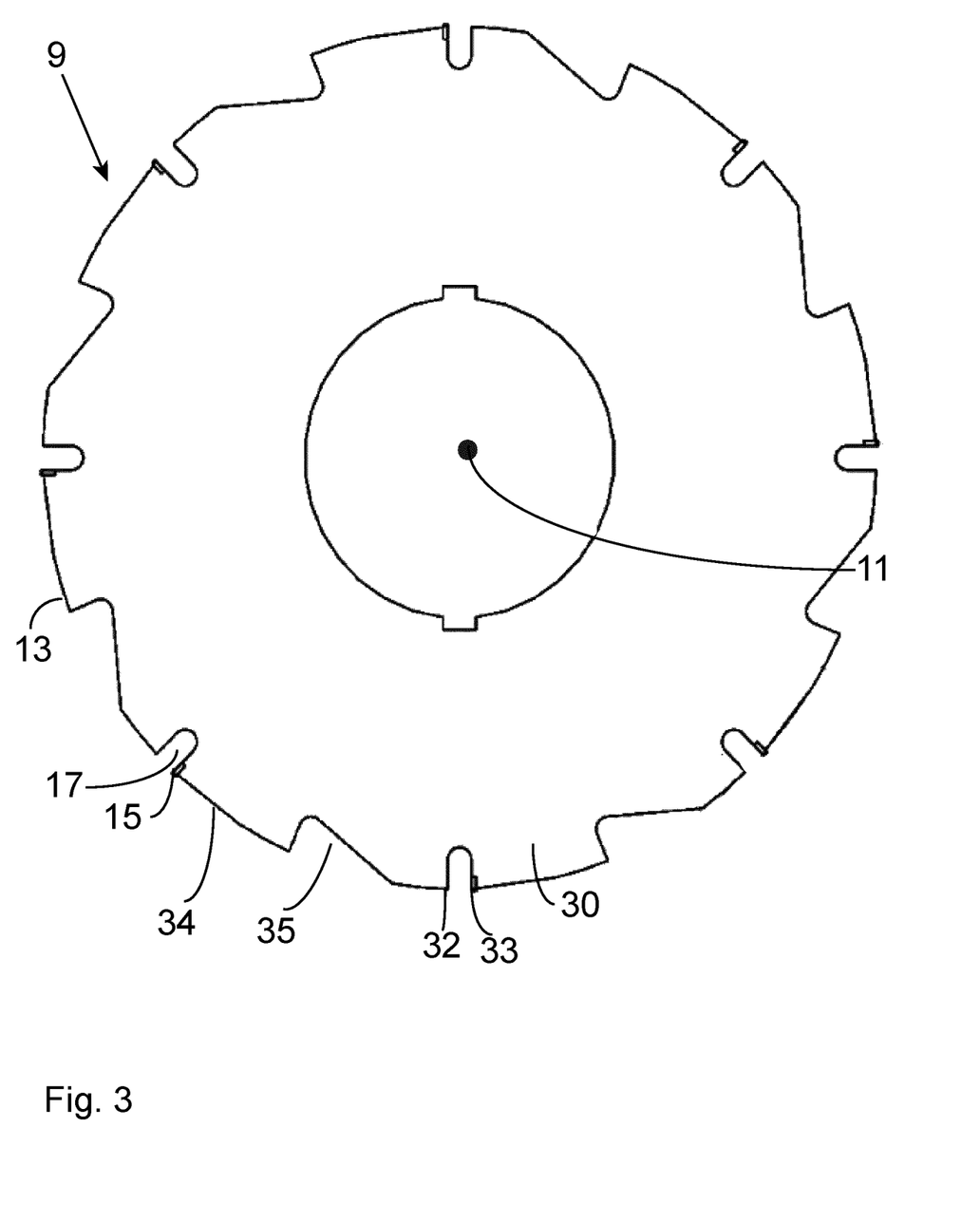
FIG. 3 shows an example of sawblade in a side view.

The shape of the collecting notches 17 may vary. In this example, the collecting notches 17 are U-shaped. Alternatively, the collecting notches 17 can be V-shaped. The collecting notches 17 are disposed in front of the cutting teeth 15 with respect to the rotational direction R so that the material cut by the teeth can be collected. The cutting teeth 15 are disposed at rear ends 33 of the collecting notches 17, as shown in FIG. 3. When the tooth 15 has cut the material, the cut material is collected in the collecting notch 17.

The interior space 5 is designed for housing the one or more sawblades 9. The at least one sawblade 9 is disposed in the interior space 5 at a distance from the interior wall 7 of the stationary housing 3 so that a gap 18 is formed between the periphery 12 of the sawblade 9 and the interior wall 7 of the housing 3 for housing a flow of cut material, as shown in FIG. 2. The width of the gap 18 varies depending on the position of the sawblade 9 with respect to the interior wall 7 of the housing 3. Preferably, the gap is larger than 0.2 mm.

The apparatus further comprises an inlet having an opening 19 for feeding material to be pulverized to the interior space 5, and an outlet having an opening 21 for dispatching the pulverized material from the interior space 5. The material to be pulverized enters the interior space 5 of the housing 3 through the inlet opening 19. The pulverized material leaves the interior space 5 of the housing 3 through the outlet opening 21 after one revolution of the sawblade 9. The inlet opening 19 and the outlet opening 21 are arranged in the interior wall 7. Both the inlet opening 19 and the outlet opening 21 are arranged in direct communication with the interior space 5. The cut material is provided direct to the outlet and do not pass through any sieve or other device for determining the size of the output material. Thus, the apparatus does not contain any sieve or other device for determine the maximum particle size of the cut material that is permitted to exit from the interior space.

The interior wall 7 is provided with a plurality of recesses 23 facing the periphery 12 of the sawblade 9, and accordingly facing the cutting teeth 15 and the collecting notches 17. The recesses 23 are designed so that they encourage a flow of cut material in the rotational direction of the cutting plates. The recesses 23 are arranged to receive cut material from the collecting notches 17 of the sawblade 9, and to revert the cut material to the periphery 12 of the sawblade 9 so that the material will be cut multiple times before it is dispatched from the apparatus. The number of recesses 23 may vary. The number of times the material is cut depends on the number of cutting teeth 15 and the number of recesses 23. Thus, number of recesses 23 is selected in dependence on the desired particle size. The recesses 23 are elongated in a tangential direction with respect to the periphery 12 of the sawblade 9, as shown in FIG. 1. The larger number of recesses, the more time is the material cut during a revolution of the sawblade 9. Accordingly, the particle size of the pulverized material depends on the number of recesses. Preferably, the number of recesses 23 is more than three, and most preferably more than 10.

The interior wall 7 provided with the recesses 23 surrounds a main part of the periphery 12 of the one or more sawblades 9. Preferably, at least 60% of the periphery of the sawblade 9 is surrounded with the interior wall 7 provided with the recesses 23 to provide large number of recesses. More preferably, at least 70% of the periphery of the sawblade 9 is surrounded with the interior wall 7 provided with the recesses 23. Large number of recesses makes it possible to pulverize the material to a desired particle size during one single revolution.

The recesses 23 have a first end 24 and a second end 25, as shown in FIG. 1. The recesses are arranged in succession so that the first end 24 of a recess 23 abuts the second end 25 of the next recess 23 in the succession.

In one aspect, the length L of the recesses 23, in a cross-section perpendicular to the rotational axis 11, is larger than the length L2 of the collecting notches 17. Preferably, the length L of the recesses 23 is at least two times larger than the length L2 of the collecting notches 17 in a cross-section perpendicular to the rotational axis 11, and more preferably, the length L of the recesses 23 is at least three times larger than the length L2 of the collecting notches 17. The shape of the recesses 23 may vary. In one aspect, the shape of the recesses 23, in a cross-section perpendicular to the rotational axis, is tapering in a direction reverse the rotational direction R of the at least one sawblade 9. Thus, the first end 24 is a narrow and the second end 25 is wide.

The second end 25 of the recess has a guiding surface 27 designed to guide the flow of cut material in the recess towards the periphery 12 of the at least one sawblade 9. The design of the guiding surface 27 may vary. Preferably, the guiding surface 27 is concave. However, the guiding surface 27 can also be straight and extend in a radial direction of the sawblade 9. The second end 25 of the recess has a wall designed to form the guiding surface 27 for directing the material flow towards the cutting teeth 15. The wall of the second end 25 is bent so that the guiding surface 27 is concave. The concave guiding surface 27 has a bending radius. In one aspect, the length L of the recesses, in a cross-section perpendicular to the rotational axis 11, is at least twice the bending radius of the guiding surface 27. Preferably, the length L of the recesses, in a cross-section perpendicular to the rotational axis 11, is at least 2.5 larger than the bending radius of the guiding surface 27. Most preferably, the length L of the recesses is at least three times larger than the bending radius of the guiding surface 27. Due to the fact that the length L of the recesses 23 is significantly larger than the bending radius of the second end 25 of the recesses, the particles in the cut material is allowed to accelerate to a high speed before they reach the concave guiding surface at the second end 25 and is redirected towards the cutting tooth 15 of the sawblade. Thus, it is ensured that the cut material reaches the cutting teeth 15 and is cut multiple times.

The size of the cut material depends on the distance between the cutting teeth 15 and the portions 26 of the interior wall 26 located at the second ends 25 of the recesses in the radial direction. In this example, the location of the interior wall 26 at the second end 25 of the recess is the same as the location of interior wall 26 at the first end 24 of the next recess. To ensure that the material is pulverized and not cut, the distance between the cutting teeth 15 and the portions 26 of the interior wall at the second end of the recess is less than 8 mm, preferably less than 4 mm, and most preferably less than 2 mm. For example, the distance between the cutting teeth 15 and the portion 26 of the wall is less than 1 mm. Large number of recesses and a short distance between the between the cutting teeth 15 and the portions 26 ensures that the material can be pulverized to a desired particle size during one single revolution.

The sawblade 9 is disposed so that the distance between the cutting teeth 15 and the interior wall 26 at the second ends 25 of the recesses is less than 8 mm, preferably less than 4 mm, and most preferably less than 2 mm.

In one aspect, the recesses 23 are elongated in a direction parallel to the rotational axis 11, as shown in FIG. 2. In this example, the recesses 23 extend in parallel with the rotational axis 11. Alternatively, the recesses 23 may extend at an angle with respect to the rotational axis 11. For example, the recesses 23 may form a herringbone pattern on the interior wall 7. The In one aspect, the housing 3 comprises a plurality of plate-shaped pieces 28 having two parallel main sides 29, as shown in FIG. 2. The plate-shaped pieces 28 are attached to each other with the main sides 29 facing each other so that that the pieces 28 together form the housing 3 with the interior space 5. This facilitates the manufacturing of the housing 3.

Figure 1A:
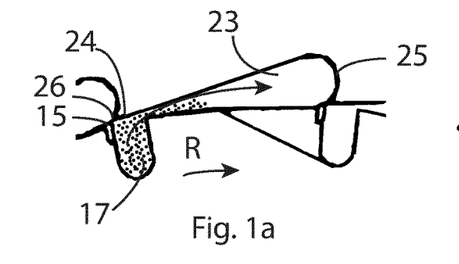
FIG. 1a illustrates how the cut material is moved from a collecting notch of the sawblade to a recess of the housing.
Figure 1B:
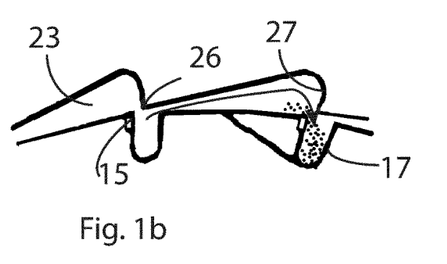
FIG. 1b illustrates how the cut material is directed from the end of the recess of the housing towards a periphery of the sawblade so that the material is cut a second time.

FIG. 1a illustrates how the cut material is moved from the collecting notch 17 of the sawblade 9 to the recess 23 of the housing 3 when the collecting notch 17 is facing the first end 24 of the recess. FIG. 1b illustrates how the cut material is directed from the second end 25 of the recess 23 of the housing 3 towards the periphery 12 of the sawblade 9.

The at least one sawblade 9 is rotating with a high speed. The cutting teeth 15 of the sawblade 9 will cut the material fed through the inlet opening 19 to the interior space 5. The collecting notches 17 will collect and house the cut material. In the beginning of a revolution, the cut material is rough. Since the sawblade 9 is rotating with respect to the stationary housing 3, each of the collecting notches 17 will face each of the recesses 23 of the stationary housing 3 once per revolution of the sawblade 9. The material is cut each time the portions 26 of the interior wall 26 faces one of the cutting teeth 15. When a collecting notch 17 is facing a recess 23 of the stationary housing 3, the cut material in the collecting notch is transferred to the first end 24 of the recess by means of the centrifugal force, as shown in FIG. 1a. When the cut material travels in the recess, the speed of the material is increased until the material reaches the second end 25 of the recess, where the speed of the cut material is reduced and the cut material is redirected by the guiding surface 27 of the recess towards the periphery 12 of the sawblade 9, as shown in FIG. 1b. When the cutting tooth 15 reaches the second end 25 of the next recess due to the rotation of the sawblade 9, the cut material will be cut a second time and collected in the collecting notch 17. Thus, the size of the material will be reduced. Each time a cutting tooth and a collecting notch pass one of the recesses 23, the material is cut one more time. The cut material is moved in the gap 18 until it reaches the outlet opening 21 where it is dispatched. The number of times the material is cut depends on the number of cutting teeth 15 and the number of recesses 23. For example, if the number of recesses 23 is 5 and the number of cutting teeth is 10, the material is cut 5*10=50 times. Thus, the size of the material can be controlled by the number of collecting notches in the stationary housing 3, and the number of cutting teeth 15. The apparatus makes it possible to pulverize material into very small particles.

FIG. 3 shows an example of sawblade 9 in a side view. The sawblade 9 comprises a disc-shaped body 30 having an outer edge 13. The periphery 12 of the sawblade is provided with a plurality of notches 17, 35 evenly distributed along the periphery. Some of the notches are collecting notches 17. The sawblade 9 further comprises a plurality of cutting teeth 15 attached to the body 30. The cutting teeth 15 are made of a harder material than the body 30. The collecting notch 17 comprises a front end 32 and a rear end 33 with respect to the rotational direction of the sawblade 9. The cutting teeth 15 are attached to the rear end 33 of the collecting notches. The cutting teeth 15 protrude from the outer edge 13 of the body 30 in a radial direction. The distance between the rotational axis 11 and the front end 32 is less than the distance between the rotational axis 11 and the upper part of the cutting teeth 15. This is, for example, achieved by having an inclined portion 34 of the outer edge 13 of the body 30, as shown in FIG. 3. The inclined portion 34 slopes towards the cutting teeth 15.

Further, the distance between the rotational axis 11 and the rear end 33 of the collecting notches is less than the distance between the rotational axis 11 and an upper end of the cutting teeth 15. The distance the cutting teeth 15 protrude from the outer edge 13 of the body 30 determines the cutting depth of the material. The periphery 12 of the sawblade 9 is provided with a plurality of empty notches 35 without any cutting teeth 15. The empty notches 35 are arranged between the collecting notches 17. Thus, a collecting notch 17 is always followed by an empty notch 35. The empty notches 35 are larger than the collecting notches 17. The distance between the empty notches 35 and the collecting notches 17 is the same. In one aspect, the width of the cutting teeth 15 is also larger than the width of the body 30 in an axial direction, i.e. in a direction parallel to the rotational axis 11 of the sawblades.

In many applications, it is a desire to be able to feed an object with a width, such as a plank of wood or a log, directly to the pulverizing apparatus without cutting it into smaller pieces. In such case, the apparatus comprises a plurality of sawblades 9 put together to a cutting unity.

Figure 4:
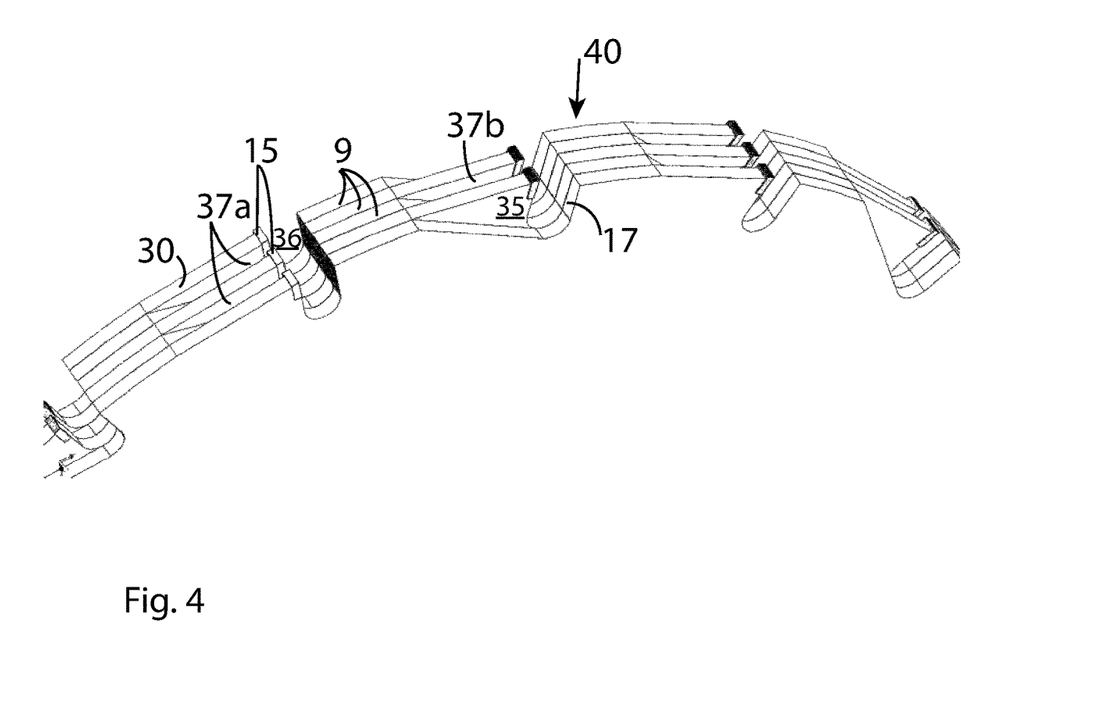
FIG. 4 shows an example of a plurality of sawblades

FIG. 4 shows an example of a plurality of sawblades 9 put together to form a cutting unity 40. Preferably, the cutting unity comprises at least three sawblades, and preferably five or more sawblades. The sawblades 9 are arranged as closed to each other as possible to enable pulverization of the material. If there is a gap between the sawblades, a part of the material may enter the gap and will not be pulverized. Preferably, the each of the sawblades 9 is arranged in mechanical contact with the neighboring sawblades in the cutting unity. This means that each sawblade abuts against the neighboring sawblade in the cutting unity 40. Thus, it is prevented that a gap is formed between the sawblades and it is ensured that all material coming into contact with the cutting unity is pulverized.

The sawblades 9 are rotated in relation to each other so that a front part of the empty notches 35 of the sawblades are aligned with the collecting notches 17 of the sawblade 9 in a direction parallel to the rotational axis 11 of the sawblades. The empty notches 35 and the collecting notches 17 together form a slot 36 in parallel with the rotational axis for collection of cut material. As seen from FIG. 4, the width of the cutting teeth 15 is larger than the width of the body 30 in an axial direction as well as in a radial direction. Due to the fact that empty notches 35 are longer than the collecting notches 17 along the periphery of the sawblade 9, grooves 37a-b are formed between the sawblades 9 and between the cutting teeth 15. Those grooves allow the cutting teeth 15 to be wider than the body 30 of the sawblade 9 in the axial direction. As seen from the figure, the sawblades are arranged so that the cutting teeth 15 and the grooves 37a-b form a plurality of groups along the periphery of the cutting unit. The cutting teeth 15 within the same group are aligned in an axial direction. Every second group has the same configuration of the cutting teeth 15 and the grooves 37a-b. However, two neighbouring groups have the cutting teeth 15 and grooves 37a-b arranged so that each groove of a first group is followed by a tooth in the next group along the periphery of the sawblade 9. By that a piece of material can be cut along its whole width. The cutting teeth 15 in two neighbouring groups cooperate to cut the material along the width of the material.

Figure 5:
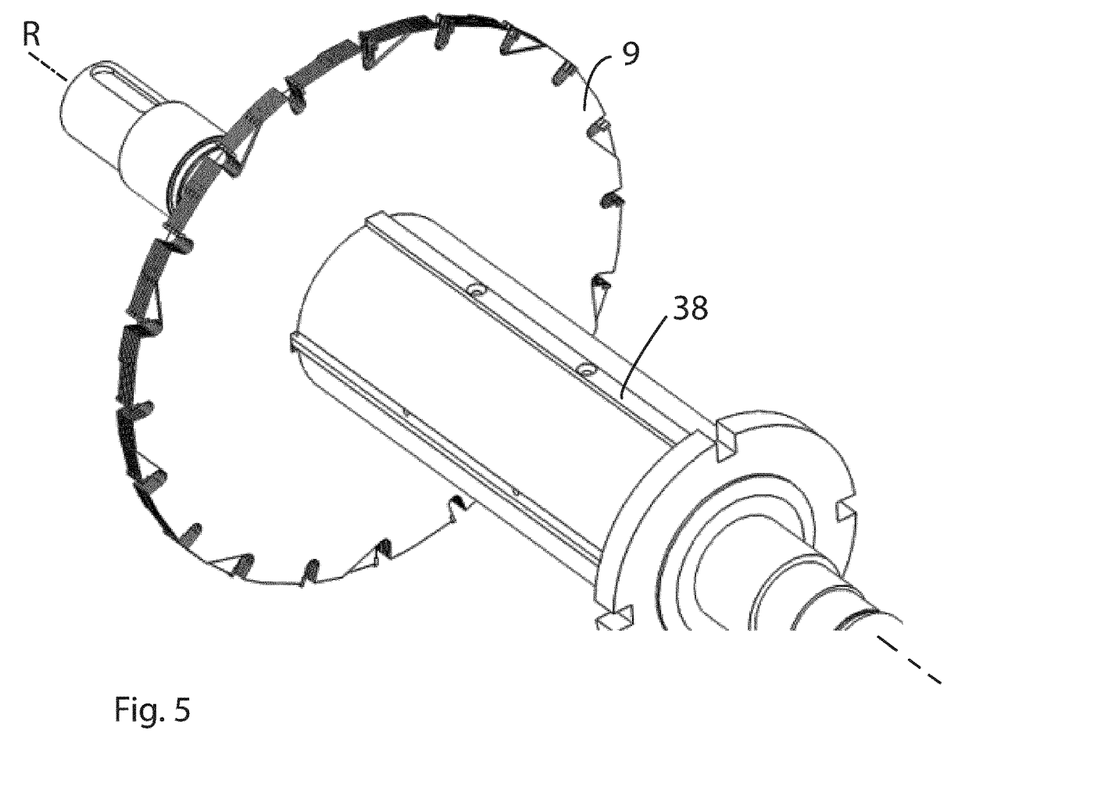
FIG. 5 shows the sawblades of FIG. 4 attached to a rotary shaft.

FIG. 5 shows the sawblades 9 of FIG. 4 attached to a rotary shaft 38. The apparatus 1 comprises at least one rotatable shaft 38 defining a rotational axis. The one or more cutting plates 9 are attached to the rotatable shaft 38 and by that arranged rotatable in a rotational direction about the rotational axis R. A part of the shaft 38 and the sawblades 9 are disposed in the interior space 5 of the housing 3.

Figure 6:
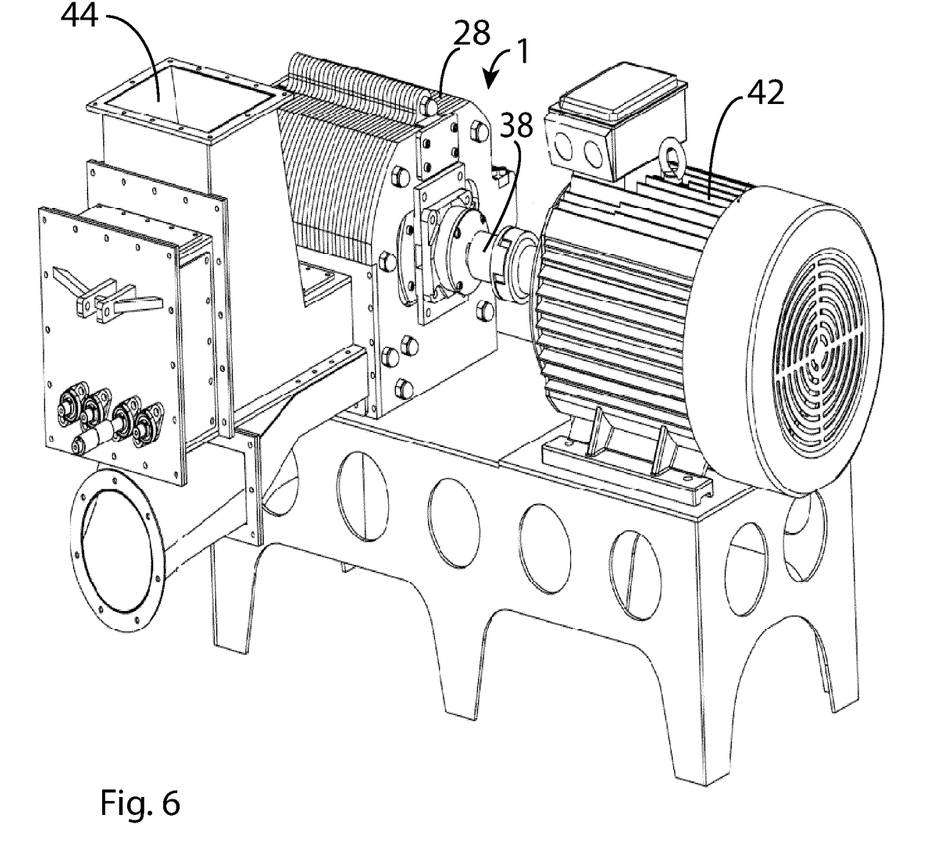
FIG. 6 shows an example of an apparatus for pulverizing a material in a perspective view.

FIG. 6 shows an example of an apparatus 1 for pulverizing a material shown in a perspective view. The apparatus comprises the stationary housing 3 as described with reference to FIGS. 1 and 2, a shaft 38 provided with one or more sawblades 9, and a motor 42 for driving the rotation of the shaft 38. The apparatus further comprises a feeding part 44 for feeding the apparatus with material to be pulverized.

In the following, a method for producing the stationary housing 3 is described. The stationary housing 3 is manufactured using one or more sheets, such as metal sheets. For example, the one or more sheets are made of cemented carbide. Suitably, the width of the one or more sheets is between 0.5 and 100 mm, preferably between 1 and 50 mm, and most preferably between 5 and 30 mm.

The method comprises:
1. Defining a plurality of plate-shaped parts by dividing the housing 3 along the central axis into a series of successive plate-shaped parts having the same width as the metal sheets. This step is, for example, carried out by using a CAD program. The design of the housing including the interior space can be determined in the CAD program. A CAD model of the housing with the desired shape can be defined in the CAD program. The CAD model of the housing is divided along its central axis into a series of successive plate-shaped parts having the defined width using the CAD program. The width of the plate-shaped parts is determined by the width of the sheets used for manufacturing the housing.
2. Determining the outer and interior contours 4a, 4b for each of the plate-shaped parts in a cross-section perpendicular to a central axis 11 of the housing, wherein the interior contour 4b is the contour of the interior space 5. This can, for example, be done in the CAD program.
3. Cutting one or more sheets having a width corresponding to the width of the plate-shaped parts into a plurality of pieces 28, each piece 28 having a shape corresponding to the outer and inner contours 4a, 4b of one of said plate-shaped parts, and comprising two parallel flat main sides 29, as shown in FIGS. 1 and 2. The cutting is, for example, made by waterjet cutting, laser cutting or flame cutting. These methods are suitable for cutting hard materials.
4. Attaching the plate-shaped pieces 28 to each other with the main sides 29 facing each other in an order corresponding to the defined series of successive plate-shaped parts, so that the pieces together form the stationary housing 3 with the interior space 5. The pieces 28 are, for example, attached to each other gluing, welding, bolting, or screwing.

The method uses cutting of thin sheets to achieve the recesses 23, instead of machining a moulded object. Thus, it is possible to use a hard material, such as cemented carbide, in the housing. Further, no machine tool is needed. The method makes it possible to manufacture a housing with a long and narrow internal space provided with recesses 23 on the interior wall. This method is simple, cost-effective and fast.

The present invention is not limited to the embodiments disclosed but may be varied and modified within the scope of the following claims. For example, the shapes of the recesses and the collecting notches may vary.

REFERENCE LIST

1 Apparatus for pulverizing a material
3 Stationary housing
4a Outer contour
4b Inner contour
5 Interior space
7 Interior wall
9 Sawblade
11 Rotational axis
12 Periphery of the sawblade
13 Outer edge of the sawblade
15 Teeth
17 Collecting notches
18 Gap
19 Inlet opening 21 Outlet opening
23 Recesses
24 First end of the recess/narrow end
25 Second end of the recess/wide end
26 portion of the interior wall
27 Guiding surface
28 Plate-shaped pieces
29 Main sides
30 Body
32 Front end of collecting notch
33 Rear end of the collecting notch
34 Inclined portion
35 Empty notches
36 Slot
37a-b Grooves
38 Rotary shaft
40 Cutting unit
42 Motor
44 Feeding part

The invention claimed is:

1. An apparatus (1) for pulverizing a material, the comprising:
a stationary housing (3) having an interior space (5) and at least one interior wall (7) facing the interior space (5),
at least one sawblade (9) disposed in the interior space (5) and arranged rotatable with respect to the stationary housing (3) in a rotational direction (R), wherein the at least one sawblade (9) is disc-shaped and has a periphery (12) provided with a plurality of cutting teeth (15) for cutting the material and a plurality of collecting notches (17) for collecting cut material,
an inlet opening (19) for feeding the material to be pulverized to the interior space (5), and
an outlet opening (21) for dispatching pulverized material from the interior space (5),
wherein an interior wall (7) is provided with a plurality of recesses (23) facing the periphery (12) of the sawblade (9), arranged to receive the cut material from the collecting notches (17) of the sawblade (9), and to revert the cut material to the periphery (12) of the sawblade (9),
the interior wall (7) provided with the recesses (23) surrounds a main part of the periphery (12) of the at least one sawblade (9), and
the inlet opening (19) and the outlet opening (21) are arranged in the interior wall (7) and in direct communication with the interior space (5) so that the material enters and leaves the interior space (5) during one revolution of the at least one sawblade (9).

2. The apparatus according to claim 1, wherein the interior wall (7) including the recesses (23) surrounds at least 60% of the periphery (12) of the at least one sawblade (9).

3. The apparatus according to claim 2, wherein the interior wall (7) including the recesses (23) surrounds at least 70% of the periphery (12) of the at least one sawblade (9).

4. The apparatus according to claim 1, wherein a length (L) of the recesses (23) is at least three times larger than a length (L2) of the collecting notches (17) in a cross-section perpendicular to a rotational axis (11).

5. The apparatus according to claim 1, wherein the at least one sawblade (9) is disposed so that a distance between the cutting teeth (15) and portions (26) of the interior wall (7) located at the rear ends (25) of the recesses (23) is less than 8 mm.

6. The apparatus according to claim 5, wherein the at least one sawblade (9) is disposed so that the distance between the cutting teeth (15) and the portions (26) of the interior wall (7) located at the rear ends (25) of the recesses (23) is less than 4 mm.

7. The apparatus according to claim 6, wherein the at least one sawblade (9) is disposed so that the distance between the cutting teeth (15) and the portions (26) the interior wall (7) located at the rear ends (25) of the recesses (23) is less than 2 mm.

8. The apparatus according to claim 1, wherein the apparatus comprises at least three sawblades (9) put together to form a cutting unity (40) and each of the sawblades (9) abuts against a neighboring sawblade in the cutting unity (40).

9. The apparatus according to claim 1, wherein each recess (23) has a narrow end (24) and a wide end (25), and the wide end (25) of the recess (23) has a guiding surface (27) designed to guide a flow of the cut material towards the periphery (12) of the at least one sawblade (9).

10. The apparatus according to claim 9, wherein the guiding surface (27) is concave and a length (L) of the recesses (23), in a cross-section perpendicular to a rotational axis (11), is at least twice a bending radius of the guiding surface(27).

11. The apparatus according to claim 9, wherein the guiding surface (27) is concave and a length (L) of the recesses (23), in a cross-section perpendicular to a rotational axis (11), is at least 2.5 times larger than a bending radius of the guiding surface(27).

12. The apparatus according to claim 1, wherein the at least one sawblade (9) is arranged rotatable with respect to the stationary housing (3) about a rotational axis (11), and a the shape of the recesses (23), in a cross-section perpendicular to the rotational axis (11), tapers in a direction reverse to the rotational direction (R) of the at least one sawblade (9).

13. The apparatus according to claim 1, wherein the at least one sawblade (9) comprises a disc-shaped body (30), the cutting teeth (15) of the at least one sawblade (9) protrude from an outer edge (13) of the body (30) in a radial direction, and the cutting teeth (15) are disposed at rear ends (33) of the collecting notches (17) with respect to the rotational direction (R).

14. The apparatus according to claim 13, wherein a width of the cutting teeth (15) is larger than a the width of the body (30) in an axial direction.

15. The apparatus according to claim 1, wherein the collecting notches (17) are evenly distributed along the periphery (12) of the at least one sawblade (9), the periphery (12) of the at least one sawblade (9) is provided with a plurality of empty notches (35) without any cutting teeth (15) arranged between the collecting notches (17), and the at least one sawblade (9) comprises a first sawblade and a second sawblade rotated in relation to the first sawblade so that the empty notches (35) of one of the first and second sawblades are aligned with the collecting notches (17) of the other of the first and second sawblades in an axial direction.

16. The apparatus according to claim 1, wherein the housing (3) comprises a plurality of plate-shaped pieces (28) having two parallel main sides (29), and the plate-shaped pieces (28) are attached to each other with the main sides (29) facing each other so that that the pieces (28) together form the housing (3) with the interior space (5).

* * * * *